US008164150B1

(12) United States Patent
Bianchi et al.

(10) Patent No.: US 8,164,150 B1
(45) Date of Patent: Apr. 24, 2012

(54) QUANTUM DOT ILLUMINATION DEVICES AND METHODS OF USE

(75) Inventors: Maurice P. Bianchi, Palos Verdes Estates, CA (US); Timothy R. Kilgore, Orange, CA (US); Arthur F. Cooper, Anaheim, CA (US); David A. Deamer, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 779 days.

(21) Appl. No.: 12/268,187

(22) Filed: Nov. 10, 2008

(51) Int. Cl.
*H01L 27/14* (2006.01)

(52) U.S. Cl. . 257/428; 257/659; 257/660; 257/E51.012; 257/E31.087; 257/E29.071

(58) Field of Classification Search .................... None
See application file for complete search history.

(56) References Cited

U.S. PATENT DOCUMENTS

| | | | |
|---|---|---|---|
| 5,015,863 A | 5/1991 | Takeshima et al. | |
| 5,229,320 A | 7/1993 | Ugajin | |
| 5,260,957 A | 11/1993 | Hakimi et al. | |
| 5,293,050 A | 3/1994 | Chapple-Sokol et al. | |
| 5,482,890 A | 1/1996 | Liu et al. | |
| 5,512,762 A | 4/1996 | Suzuki et al. | |
| 5,559,822 A | 9/1996 | Pankove et al. | |
| 5,684,309 A | 11/1997 | McIntosh et al. | |
| 5,888,885 A | 3/1999 | Xie | |
| 5,906,670 A | 5/1999 | Dobson et al. | |
| 6,235,148 B1 * | 5/2001 | Courson et al. | 156/379.6 |
| 6,768,754 B1 | 7/2004 | Fafard | |
| 7,103,079 B2 | 9/2006 | McInerney et al. | |
| 7,183,718 B2 | 2/2007 | Yoshida | |
| 7,192,999 B2 | 3/2007 | Mercado et al. | |
| 7,264,527 B2 | 9/2007 | Bawendi et al. | |
| 2006/0261325 A1 * | 11/2006 | Zanrosso et al. | 257/14 |
| 2008/0175292 A1 | 7/2008 | Sheik-Bahae | |

OTHER PUBLICATIONS

Xiaogang Peng et al.; Epitaxial Growth of Highly Luminescent CdSe/CdS Core/Shell Nanocrystals with Photostability and Electronic Accessibility; Journal of the American Chemical Society (JACS); 1997; pp. 7019-7029; 119 (30); American Chemical Society, Washington, DC, USA.

B.O. Dabbousi et al.; (CdSe)ZnS Core-Shell Quantum Dots: Synthesis and Characterization of a Size Series of Highly Luminescent Nanocrystallites; The Journal of Physical Chemistry B; 1997; pp. 9463-9475; 101 (46); American Chemical Society, Washington, DC, USA.

(Continued)

*Primary Examiner* — Evan Pert
*Assistant Examiner* — Scott R Wilson
(74) *Attorney, Agent, or Firm* — Moore & Van Allen LLC

(57) ABSTRACT

The present disclosure relates to illumination devices and methods of generating light for extended periods of time without requiring an outside source of power, recharging, refueling or maintenance. The devices of the present disclosure comprise a plurality of quantum dots and a radioisotope, and may be used in numerous ways, for example, for the marking critical areas or paths, for the illumination of pathways in aircraft, ships, trains, buildings, and other facilities where these routes must be precisely delineated or identified for safety reasons, for the inclusion of signs or other indicia that must be illuminated at all times, as well as many military uses, such as for the demarcation of temporary airfields for fixed-wing aircraft or helicopters or for IFF (identification friend or foe).

27 Claims, 6 Drawing Sheets

OTHER PUBLICATIONS

Margaret A. Hines et al.; Synthesis and Characterization of Strongly Luminescing ZnS-Capped CdSe Nanocrystals; The Journal of Physical Chemistry; 1996; pp. 468-471; 100 (2); American Chemical Society, Washington, DC, USA.

Jun Zhang et al.; Wet-Chemical Synthesis of ZnTe Quantum Dots; Mater. Res. Soc. Symp. Proc.; 2006; vol. 942; Materials Research Society.

Biersack et al.; Ion Beam Induced Changes of the Refractive Index of PMMA; Nuclear Instruments and Methods in Physics Research B46; 1990; pp. 309-312; Elsevier Science Publishers B.V. (North-Holland).

Calvert; Vegetable and mineral; Nature; Oct. 1991; pp. 501-502; vol. 353; Nature Publishing Group.

Finlayson et al.; Infrared Emitting PbSe Quantum Dots for Telecommunications-Window Applications; OSA/ ASSP 2005.

Franklin et al.; Refractive Index Matching: A General Method for Enhancing the Optical Clarity of a Hydrogel Matrix; Chemistry of Materials; 2002; pp. 4487-4489; 14; American Chemical Society.

Hecht, Jeff; "*The Laser Book*," $2^{nd}$ Ed., Tab Books, Blue Ridge Summit, PA, (1992); ISBN 0-07-027737-0; pp. 389-417 (Chapter 22).

Jiang et al., "Transparent Electro-Optic Ceramics and Devices," Optoelectronic Devices and Integration. Edited by Ming, Hai; Zhang, Xuping; Chen, Maggie Yihong. Proceedings of the SPIE, vol. 5644, pp. 380-394 (2005).

Jiang et al.; Optimizing the Synthesis of Red-to Near-IR-Emitting CdS-Capped CdTexSel-x Alloyed Quantum Dots for Biomedical Imaging; Chem. Mater.; 2006; pp. 4845-4854; 18; American Chemical Society.

Jin et al.; Gd3+-functionalized near-infrared quantum dots for in vivo dual modal (fluorescence/magnetic resonance) imaging; Chem. Commun.; 2008; pp. 5764-5766; The Royal Society of Chemistry 2008.

Klonkowski et al.; Emission enhancement of Eu(III) and/or Tb(III) ions entrapped in silica xerogels with ZnO nanoparticles by energy transfer; Journal of Non-Crystalline Solids; 352; 2006; pp. 4183-4189; Elsevier B.V.

Krier et al.; Mid-infrared electroluminescence from InAsSb quantum dot light emitting diodes grown by liquid phase epitaxy; Physica E 15; 2002; pp. 159-163; Elsevier Science B.V.

Kuntz et al.; 10Gbit/s data modulation suing 1.3 pm InGaAs quantum dot lasers; Electronic Letters; Mar. 3, 2005; vol. 41, No. 5; IEE.

Leon; Intermixing induced tunability in infrared emitting InGaAs/GaAs quantum dots; SPIE; Jul. 1999; vol. 3794; Part of the SPIE Conference Materials for High-Speed Detectors; Denver, CO, US.

Madler et al.; Rapid synthesis of stable ZnO quantum dots; Journal of Applied Science; vol. 92, No. 11; Dec. 1, 2002; pp. 6537-6540; American Institute of Physics.

Mao et al.; Synthesis of high-quality near-infrared-emitting CdTeS alloyed quantum dots via the hydrothermal method; Nanotechnology; 2007; 485611 (7pp); 18; 10P Publishing Ltd.; UK.

Novak; Hybrid Nanocomposite Materials-Between Inorganic Glasses and Organic Polymers; Advanced Materials; 1993; pp. 422-433; 5, No. 6; VHC Verlagsgesellschaft mbH, D-69469 1993.

Otsubo et al.; Temperature-Insensitive Eye-Opening under 10-Gb/s Modulation of 1.3-pm P-Doped Quantum- Dot Lasers without Current Adjustments; Japanese Journal of Applied Physics; 2004; pp. L1124-L1126; vol. 43, No. 8B; The Japan Society of Applied Physics.

Peng et al.; Formation of High-Quality CdTe, CdSe, and CdS Nanocrystals Using CdO as Precursor; J. Am. Chem. Soc.; 2001; vol. 123, No. 1; pp. 183-184; American Chemical Society.

Qu et al.; Alternative Routes toward High Quality CdSe Nanocrystals; Nano Letters; 2001; pp. 333-337; vol. 1, No. 6; American Chemical Society.

Schaller et al., Seven Excitons At A Cost Of One: Redefining The Limits For Conversion Efficiency Of Photons Into Charge Carriers Nano Lett. Mar. 2006;6(3):424-9.

Shabaev et al., Multiexciton Generation by a Single Photon in Nanocrystals, Nano Lett. (2006) 6(12).

Shan et al.; The structure and character of CdSe nanocrystals capped ZnO layer for phase transfer from hexane to ethanol solution; Surface Science; 582; 2005; pp. 61-68; Elsevier B.V.

Song et al., Red light emitting solid state hybrid quantum dot-near-UV GaN LED devices Nanotechnology 2007 18 255202 (4pp).

Ulrich; Prospects for Sol-Gel Processes; Journal of Non-Crystalline Solids; 1990; pp. 465-479; 121; Elsevier Science Publishers B.V. (North-Holland).

Wasserman et al.; Mid-Infrared Electroluminescence from InAs Self-Assembled Quantum Dots; Proc. of SPIE; 2006; vol. 6386, 6386E-1.

Wu et al; Surface modification of ZnO nanocrystals; Applied Surface Science; 253; 2007; pp. 5473-5479; Elsevier B.V.

\* cited by examiner

QUANTUM DOT ILLUMINATION DEVICES AND METHODS OF USE

FIELD OF THE DISCLOSURE

This disclosure relates to self-powered, stand alone illumination devices and methods for producing controlled light emission by utilizing quantum dot nanocrystals and a radioisotope source.

BACKGROUND

Lightings systems serve many important purposes, such as navigational aids for aircrafts, boats, or other vehicles, and providing guidance, signaling, and demarcation functions and the like. As with most electrical devices, these lighting systems require a steady supply of electrical power to operate, either through hardwiring via powerlines connected to power plants, or where hardwiring is not possible, through means such as batteries, generators, and solar power. These alternative power sources, however, have many drawbacks. For example, batteries and generators often have short operating lives before needing recharging, replacement and/or refueling. Similarly, solar power requires the need for expensive solar cells that utilize large surface areas and are often expensive, fragile, and vulnerable to the elements. Moreover, contact with sunlight is not constant, and operation in cloudy conditions or at night requires the use of storage batteries.

There are many instances where power sources are not available and recharging, refueling or maintenance is impractical or impossible. For example, in certain military applications, such as for the demarcation of a temporary landing sites in remote locations, the lighting apparatus must be portable, quickly deployable and able to illuminate for long periods of time without the aid of electrical power, refueling or recharging. In other instances, illumination is required for signs and emergency lighting in aircraft, ships, trains and buildings where electrical power is not available.

As such, it would be advantageous to provide a self-contained and self-powered illumination device that provides long-lasting, uninterrupted power for the generation of light.

SUMMARY

The present disclosure provides devices and methods for providing illuminating light utilizing quantum dots that convert at least some of the subatomic particles emitted from a radioisotope fuel source to longer wavelength light.

One aspect of the disclosure provides an illumination device comprising a plurality of quantum dots, a radioisotope that is capable of emitting alpha or beta radiation, and a transparent or translucent medium, wherein the radioisotope and plurality of quantum dots are embedded in the transparent medium and wherein the radioisotope is in radioactive communication with the plurality of quantum dots, resulting in illuminated light.

In one embodiment, comprises an inert material. In another embodiment, the quantum dot comprises a core selected from the group consisting of CdS, CdSe, CdTe, ZnS, ZnS, ZnSe, ZnTe, GaAs, GaP, GaAs, GaSb, HgS, HgSe, HgTe, InAs, InP, InSb, AlAs, AlP, AlSb, PbS, PbSe, PbTe alloys thereof, and combinations thereof. In another embodiment, the quantum dot further comprises a coating selected from the group consisting of ZnO, ZnS, ZnSe, ZnTe, CdO, CdS, CdSe, CdTe, MgS, MgSe, GaAs, GaN, GaP, GaSb, HgO, HgS, HgSe, HgTe, InAs, InN, InP, InSb, AlAs, AlN, AlP, AlSb, alloys thereof, and combinations thereof.

In another embodiment, the quantum dot comprises a diameter in a range from 1 nm to 50 nm, 1 nm to 40, or 1 nm to 20 nm.

In one embodiment, the quantum dot emits light in a wavelength of $10^3$ to $10^{-12}$ meters, $10^{-2}$ to $10^{-10}$ meters, or $10^{-5}$ to $10^{-8}$ meters when excited by the alpha or beta particle.

In another embodiment, the radioisotope is selected from the group consisting of nickel-63, thallium-204, strontium-90, promethium-147, phosphorous-32, iodine-131, potassium-42 and gold-198. In certain embodiments, the radioisotope is nickel-63.

In another embodiment, the medium is selected from the group consisting of Sol Gel glass, polyacrylate, polystyrene, polyimide, polyacrylamide, polyethylene, polymethylmethacrylate polyvinyl, poly-diacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, and cellulose. In certain embodiments, the medium is Sol Gel glass or polymethylmethacrylate.

In other embodiments, the medium is in the form of a strip. In one embodiment, the strip has a thickness of less than on inch. In certain embodiments, the medium further comprises an attaching means.

Another aspect of the disclosure comprises a radioisotope capable of emitting alpha or beta particles, a plurality of quantum dots, and a container, wherein the radioisotope and quantum dots are positioned within the container.

In one embodiment, the radioisotope and plurality of quantum dots are co-mingled within the container, wherein the co-mingling results in the radioisotope and plurality of quantum dots being in radioactive communication, resulting in illuminated light. In certain embodiments, the container is transparent or translucent. In other embodiments, the radioisotope and plurality of quantum dots are in the form selected from the group consisting of a powder and solution.

In another embodiment, the container further comprises a removable top, wherein upon removal of the top the powder or solution can be dispersed from the container.

In another embodiment, the container further comprises a first compartment, a second compartment, and a dividing means, wherein the radioisotope is located in the first compartment and the plurality of quantum dots is located in the second compartment, and wherein the dividing means prevents the radioisotope and plurality of quantum dots from being in radioactive communication with each other.

In one embodiment, the dividing means is removable, wherein upon removal of the dividing, the radioisotope and plurality of quantum dots co-mingle, wherein the co-mingling causes the radioisotope and plurality of quantum dots to be in radioactive communication resulting in illuminated light.

In another embodiment, the dividing means is breakable, wherein upon flexing or shaking of the container, the dividing means breaks allowing the radioisotope and plurality of quantum dots to co-mingle, wherein the co-mingling causes in the radioisotope and plurality of quantum dots to be in radioactive communication, resulting in illuminated light.

In one embodiment, the device is handheld. In another embodiment, the device is portable.

Another aspect of the disclosure comprises a method of generating light comprising providing a radioisotope capable of emitting alpha or beta particles, providing a plurality of quantum dots, and co-mingling the radioisotope and plurality of quantum dots, wherein the co-mingling results in the radioisotope and plurality of quantum dots being in radioactive communication resulting in illuminated light.

In one embodiment, the method further comprises the step of providing a medium, wherein said co-mingled radioisotope and plurality of quantum dots are embedded within said medium.

In another embodiment, the method further comprises the step of providing a transparent or translucent container, wherein said co-mingled radioisotope and plurality of quantum dots are contained within said container.

In certain embodiments, the container further comprises a first compartment, a second compartment, and a removable dividing means, wherein said radioisotope is located in said first compartment, said plurality of quantum dots is located in said second compartment, wherein said dividing means prevents said radioisotope and said plurality of quantum dots from being in radioactive communication with each other, and wherein removing said dividing means results in co-mingling of said radioisotope and said plurality of quantum dots.

Various other aspects, features and embodiments will be more fully apparent from the ensuing discussion and appended claims.

DETAILED DESCRIPTION

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, preferred methods and materials are described herein.

The articles "a" and "an" are used herein to refer to one or to more than one (i.e. at least one) of the grammatical object of the article. By way of example, "an element" means at least one element and can include more than one element.

The present disclosure relates to illumination devices and methods of generating light for extended periods of time without requiring an outside source of power, recharging, refueling or maintenance. The devices of the present disclosure may be used in numerous ways, for example, for the marking of critical areas or paths, for the illumination of pathways in aircraft, ships, trains, buildings, and other facilities where these routes must be precisely delineated or identified for safety reasons, for the inclusion of signs or other indicia that must be illuminated at all times, as well as many military uses, such as for the demarcation of temporary airfields for fixed-wing aircraft or helicopters or for IFF (identification friend or foe).

Figure 1:
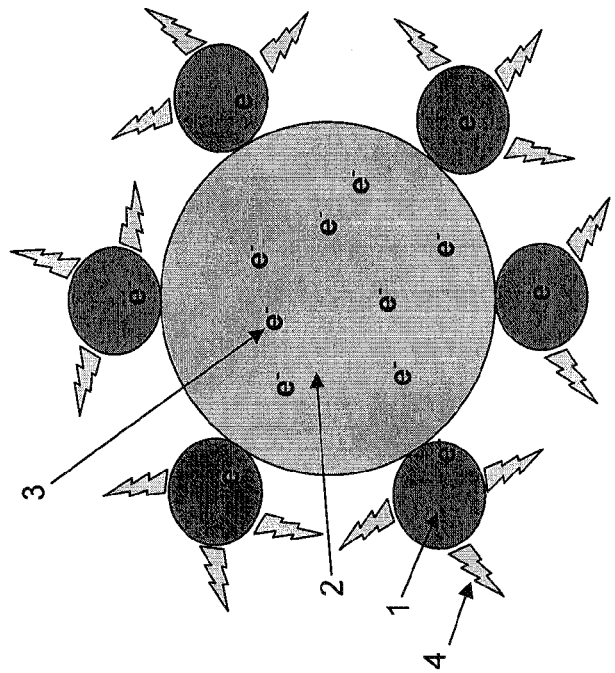
FIGS. 1A and 1B represent schematics depicting of the interaction between a quantum dot and radioisotope in accordance with the disclosure.
Figure 1:
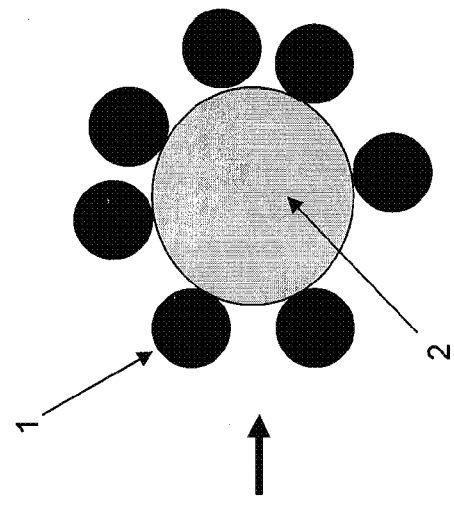
Figure 1:
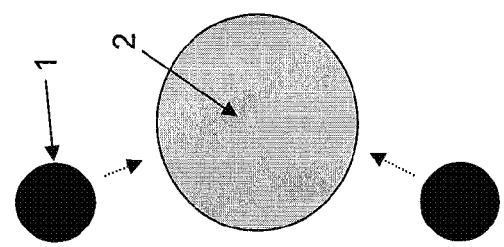

In general terms, and as shown in FIG. 1A, the methods and devices of the present disclosure involve placing a plurality of quantum dots 1 in radioactive communication with a radioisotope 2 that is capable of emitting radiation. As used herein, the term "radioactive communication" refers to the ability of the particles emitted from the radioisotope to reach and excite the quantum dot. In one embodiment, the much smaller quantum dots are attracted to, and readily adhere, to the surface of the much larger radioisotope particle by electrostatic attraction. In another embodiment, the quantum dot can be made to adhere to the radioisotope by means of an adhesive or binder. Any adhesive or binder suitable for use with quantum dots are within the scope of the disclosure and can be readily determined by one skilled in the art. As shown in FIG. 1B, the radiation 3 emitted from the radioisotope 2 is absorbed by the quantum dots 1 which then produce electron hole pairs that recombine to emit photons 4 in a fairly narrow region centered around the bandgap of the quantum dot 1. Hence, the wavelength of the generated light will depend on the bandgap of the quantum dots selected.

As used herein, the terms "light" and "photon" are used interchangeably, and are defined as a discreet bundle of electromagnetic energy. These terms are intended to include gamma rays, x-rays, ultraviolet rays, visible light, infrared light, microwaves and radiowaves.

Figure 2A:
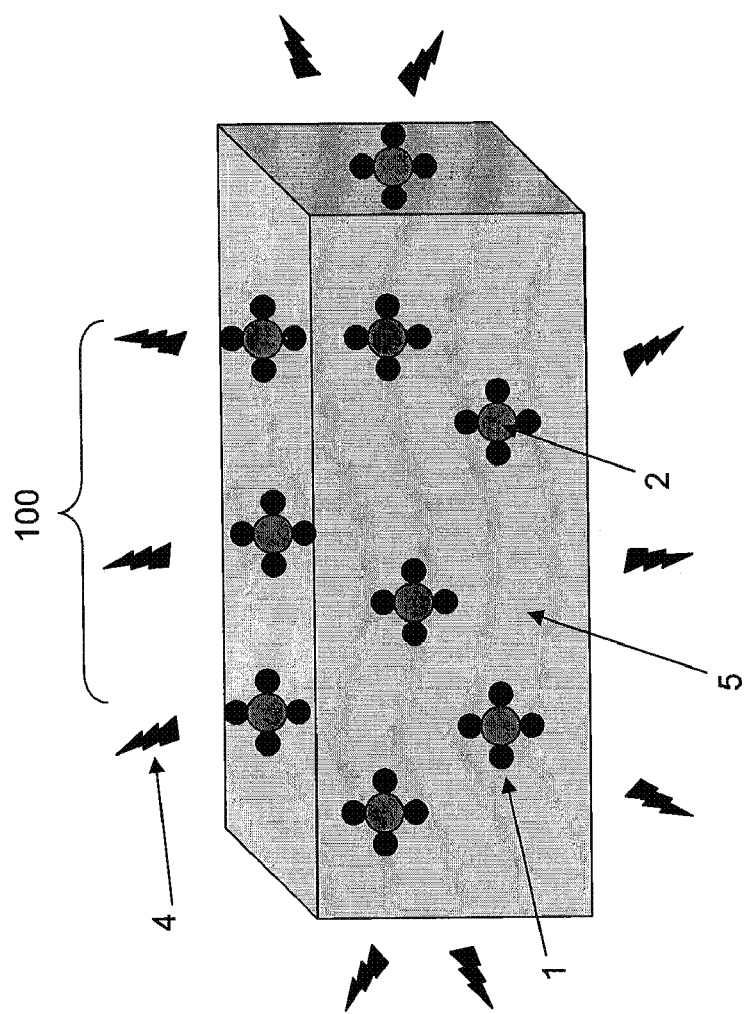
FIGS. 2A-2E are representative embodiments of self-powered illumination devices according to the present disclosure.

With reference to FIG. 2A, one aspect of the disclosure provides an illumination device 100 comprising a plurality of quantum dots 1 and a radioisotope 2 embedded in a medium 5. The plurality of quantum dots 1 and radioisotope 2 are in radioactive communication with each other.

As will be appreciated by the ordinary skilled artisan, the radioisotope 2 of the present disclosure refers to any atom with an unstable nucleus that undergoes radioactive decay and emits subatomic particle(s). As used herein, the term "subatomic particles" refers to the elemental or composite particle which is smaller than an atom, such as alpha, beta and gamma particles, quarks, protons, neutrons, electrons and the like. Preferably, and as can be readily determined by one skilled in the art, the radioisotope heat source of the present disclosure will have a half-life long enough to produce energy at a relatively continuous rate for a reasonable amount of time while also being long enough such that it decays sufficiently quickly enough to generate a usable amount of radiation. In certain embodiments, the radioisotope heat source will emit alpha rays. In other embodiments, the radioisotope heat source will emit beta rays. Examples of radioisotope heat sources may include, but are not limited to, gold-198, carbon-14, calcium-37, cobalt-60, cesium-137, iridium-192, iron-53, francium-220, hydrogen-3, iodine-131, potassium-37, potassium-42, krypton-85, nitrogen-16, neon-19, promethium-147, phosphorous-32, plutonium-239, radium-226, radon-222, strontium-90, technetium-99, thallium-204, thorium-232, uranium-233, uranium-235, uranium-238, rhenium-188, rhenium-186, xenon-133 and nickel-63. In preferred embodiments, the radioisotope is nickel-63, strontium-90, promethium-147 and phosphorous-32. Preferably, the radioisotope is nickel-63.

As will be appreciated by the ordinary skilled artisan, the term "quantum dot" (herein also referred to as "QD") in the present disclosure is used to denote a semiconductor nanocrystal. In one aspect of the disclosure, the QD comprises only one type of material, however, it is also within the scope of this disclosure that the QD comprise a core and a cap comprised of different materials (i.e. fluorescence of the QD can be increased and enhanced by using a core/cap structure). Hence, in those embodiments where fluorescence of the QD is desired, a core/cap structure may be used. Regardless of whether a single material or a core/cap structure is used, the entire QD preferably has a diameter ranging from 0.5 nm to 50 nm, more preferably from 1 nm to 40 nm, more preferably from 1 nm to 30 nm, and more preferably from 1 nm to 20 nm.

In one embodiment, the QD comprises a "core" that is a nanoparticle-sized semiconductor. Any core of the II-VI semiconductors (e.g., ZnS, ZnSe, ZnTe, CdS, CdSe, CdTe, HgS, HgSe, HgTe, alloys thereof and mixtures thereof), III-V semiconductors (e.g., GaAs, GaP, GaSb, InGaAs, InAs, InP, InSb, AlAs, AlP, AlSb, alloys thereof and mixtures thereof), IV (e.g., Ge, Si) or IV-VI semiconductors (e.g., PbS, PbSe, PbTe) can be used in the context of the present disclosure. In a certain embodiments, the core is a semiconductor that comprises a narrow band gap, typically less than 3 eV, preferably less than 2 eV, more preferably less than 1 eV.

In another embodiment, the wavelength emitted by the QDs is selected according to the physical properties of the QDs, such as the size of the nanocrystal. Preferably, the wavelength emitted by the QDs of the present disclosure upon excitation by alpha or beta particles is in the visible to infra red (IR) wavelength regime. For example, CdSe QDs can be produced that emit colors visible to the human eye, so that in combination with a source of higher energy than the highest energy of the desired color, these QDs can be tailored to produce visible light of a spectral distribution. QDs can also be produced to emit light in the ultraviolet and infra red spectral ranges. Examples of ultraviolet- and infrared-emitting QDs include, but are not limited to, CdS, ZnS, and ZnSe, and InAs, CdTe and MgTe, respectively. Hence, the wavelength of the emitted light depends on the bandgap of the quantum dots selected. Preferable wavelengths emitted by the QDs upon excitation with alpha or beta particles of the present disclosure include the range of $10^3$ to $10^{-12}$ meters, preferably $10^{-2}$ to $10^{-10}$ meters, and more preferably $10^{-5}$ to $10^{-8}$ meters.

As used herein, the term "visible light" refers to those wavelengths found on the electromagnetic spectrum between ultraviolet light and infra red light that are visible with the human eye. Typical wavelengths for visible light range between 325 nm and 800 nm in length, preferably between 350 nm and 775 nm in length, more preferably between 375 nm and 760 nm, and more preferably between 380 nm and 750 nm.

As used herein, the term "infra red light" refers to the wavelength of light which is longer than visible light but shorter than terahertz radiation and microwaves. Infra red light has a wavelength of between 750 nm and 1 mm. According to the International Commission on Illumination, infra red light encompasses three "subdivisions" based on wavelength. These include: (1) Infra Red-A (IR-A) that has a wavelength range of about 700 nm to 1400 nm; (2) Infra Red-B (IR-B) that has a wavelength range of about 1400 nm to 3000 nm; and (3) Infra Red-C (IR-C) that has a wavelength range of about 3000 nm to 1 mm. Those skilled in the art will also recognize that Infra Red light may also be subclassified according to the following scheme: (1) Near-infra red (NIR) that has a wavelength of about 0.75 to 1.4 μm; Short-wavelength infra red (SWIR) that has a wavelength of about 1.4 μm to 3 μm; (3) Mid-wavelength infra red (MWIR) that has a wavelength of about 3 μm to 8 μm; (4) Long-wavelength infra red (LWIR) that has a wavelength of about 8 μm to 15 μm; and (5) Far infra red (FIR) that has a wavelength of about 15 μm to 1,000 μm. All of these are within the scope of the present disclosure. In certain embodiments, it is advantageous for the QD to emit light in the infra red wavelength. For example, in certain military applications, it will be advantageous to be able to mark friendly infantry and/or equipment for identification purposes. In such a scenario, a device according to the present disclosure will comprise a radioisotope and a plurality of QDs tuned to emit light in the infra red wavelength so that the emitted light would not be visible to the naked eye.

As used herein, the term "ultraviolet light" refers to those wavelengths found on the electromagnetic spectrum between visible light and soft x-rays. Ultraviolet light encompasses five "subdivisions" based on wavelength. These include: (1) NUV (also known as Near) that has a wavelength range of 200 nm-400 nm; (2) UVA (also known as long wave or black light) that have a wavelength range of 320 to 400 nm; (3) UVB (also known as medium wave) that have a wavelength range of 280 nm to 320 nm; and (4) UVC (also known as short wave or germicidal) that have a wavelength range of below 280 nm. Those wavelengths below 280 nm have also been further subdivided to include FUV/VUV (also known as far or vacuum UV) that has a wavelength range of 10 nm to 200 nm and EUV/XUV (also known as Extreme or Deep UV) that has a wavelength range of 1 nm to 31 nm). Preferable ultraviolet light wavelengths used in the present disclosure include the range of 1 nm to 300 nm, preferably 10 nm to 280 nm, more preferably 50 nm to 275 nm, and more preferably 100 nm to 260 nm.

In another embodiment, the QDs may be "tuned" by varying the composition and the size of the QD and/or adding one or more caps around the core in the form of concentric shells to widen the band gap width of the QD. As the QD approaches the excitation Bohr radius of the semiconductor of the QD, the band gap will get wider. Therefore, the smaller the QD, the wider the band gap. For example, the band gap of gallium arsenide in bulk is 1.52 electron volts (eV), while a QD consisting of 933 atoms of gallium and arsenide has a band gap of 2.8 eV, and a dot half as big, with 465 atoms, has a band gap of 3.2 eV. This results in the QD's light emission wavelength going from the red portion of the visible spectrum to the violet/ultraviolet portion of the visible spectrum. Therefore, changing the band gap, and thus the color of light a QD absorbs or emits, requires only adding or subtracting atoms from the QD.

In another embodiment, it may also be desirable to tailor the size distribution of the QDs of a particular core composition to tailor the color of light which is produced by the device. The size distribution may be random, gradient, monomodal or multimodal and may exhibit one or more narrow peaks. For example, the QDs dispersed in the matrix may vary in diameter by less than a 10% rms, thus ensuring production of light in a monochromatic color. As used herein, the term "monochromatic" is meant to include those photons generated by the QDs consisting of radiation of a single wavelength or of a very small range of wavelengths. In one embodiment, the wavelength range is between 10 and 100 nm, preferably between 10 and 80 nm, more preferably between 10 and 60 nm, and most preferably between 10 and 50 nm. In other embodiments, QDs of varying diameters may be used to ensure production of light in a polychromatic color. As used herein, the term "polychromatic" refers to color generated by the QDs as comprising photons of a wider wavelength range.

In another embodiment, where fluorescence by the QD is desired, the core semiconductor may further comprise a "cap" or "shell." The "cap" is a semiconductor that differs from the semiconductor of the core and binds to the core, thereby forming a surface layer or shell on the core. The cap must be such that, upon combination with a given semiconductor core, results in a luminescent quantum dot. In this regard, the cap helps stabilize and enhance the fluorescence emitted by the excited core (e.g., when the core is contacted with ultraviolet light). Preferably, the cap passivates the core by having a higher band gap than the core, so the excitation of the QD is confined to the core, thereby eliminating nonradiative pathways and preventing photochemical degradation. Typical examples of QD cores include, but are not limited to, ZnO, ZnS, ZnSe, ZnTe, CdO, CdS, CdSe, CdTe, MgS, MgSe, GaSa, GaN, GaP, GaSb, HgO, HgS, HgSe, HgTe, InAs, InN, InP, InSb, AlAs, AlN, AlP, AlSb, alloys thereof, and combinations thereof. Some examples of core:cap combination which are within the scope of the present disclosure include, but are not limited to, CdS/HgS/CdS, InAs/GaAs, GaAs/AlGaAs, and CdSe/ZnS. In general, the cap is 1-10 monolayers thick, more preferably 1-5 monolayers, and most preferably 1-3 monolayers. A fraction of a monolayer is also encompassed under the present disclosure.

In other embodiments, for example, the plurality of quantum dots is selected from the group consisting of gallium arsenide (GaAs), indium gallium arsenide (InGaAs), and gallium nitride (GaN). In another embodiment, the plurality of quantum dots may comprise $TiO_2$ nanoparticles coated with $Al_2O_3$ to prevent flocculation.

QDs may be synthesized in various ways. Some common methods include (1) the spontaneous generation in quantum well structures due to monolayer fluctuations in the well's thickness; (2) the capability of self-assembled QDs to nucleate spontaneously under certain conditions during molecule beam epitaxy (MBE) and metallorganic vapor phase epitaxy (MOVPE), when the material is grown in a substrate to which it is not lattice matched; (3) the ability of individual QDs to be created from two-dimensional electron or hole gases present in remotely doped quantum wells or semiconductor heterostructures; and (4) chemical methods, such as synthesizing ZnTe QDs in high-temperature organic solution (see, e.g., Zhang, J. et al. Materials Research Society Symposium Proceedings, Vol. 942, 2006). These and other processes for the synthesis of QDs are well known in the art as disclosed, for example, by U.S. Pat. Nos. 5,906,670, 5,888,885, 5,229,320, 5,482,890, and Hines, M. A. J. Phys. Chem., 100, 468-471 (1996), Dabbousi, B. O. J. Phys. Chem. B, 101, 9463-9475 (1997), Peng, X., J. Am. Chem. Soc., 119, 7019-7029 (1997), which are incorporated herein by way of reference.

In accordance with one aspect of the present disclosure, and referring again to FIG. 2A, the quantum dots 1 are dispersed and embedded within a material 5. The material 5 refers to any material in which QDs 1 can be dispersed and that is at least partially transparent or translucent, i.e., allows light to pass through, or conductive of light from the radioisotope 2. In certain embodiments, the material 5 contains a dispersion of QDs 1, wherein the size and distribution of the QDs has been chosen to produce light of a certain wavelength.

As used herein, the term "embedded" refers to the quantum dot and radioisotope being fixed firmly in a surrounding mass, or enclosed snugly or firmly within a material. In some embodiments, the material may be translucent. In other embodiments, the material may be transparent. Some examples of materials include, but are not limited to, Sol-Gel glass, polyacrylate, polystyrene, polyimide, polyacrylamide, polyethylene, polymethylmethacrylate, polyvinyl, poly-diacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, cellulose and the like. In preferred embodiments, the matrix is Sol Gel glass or polymethylmethacrylate. It is also within the scope of this disclosure that the material may also be a solution, such as diethylene glycol solution comprising rhodamine 640 perchlorate dye.

Figures 2B, 2C:
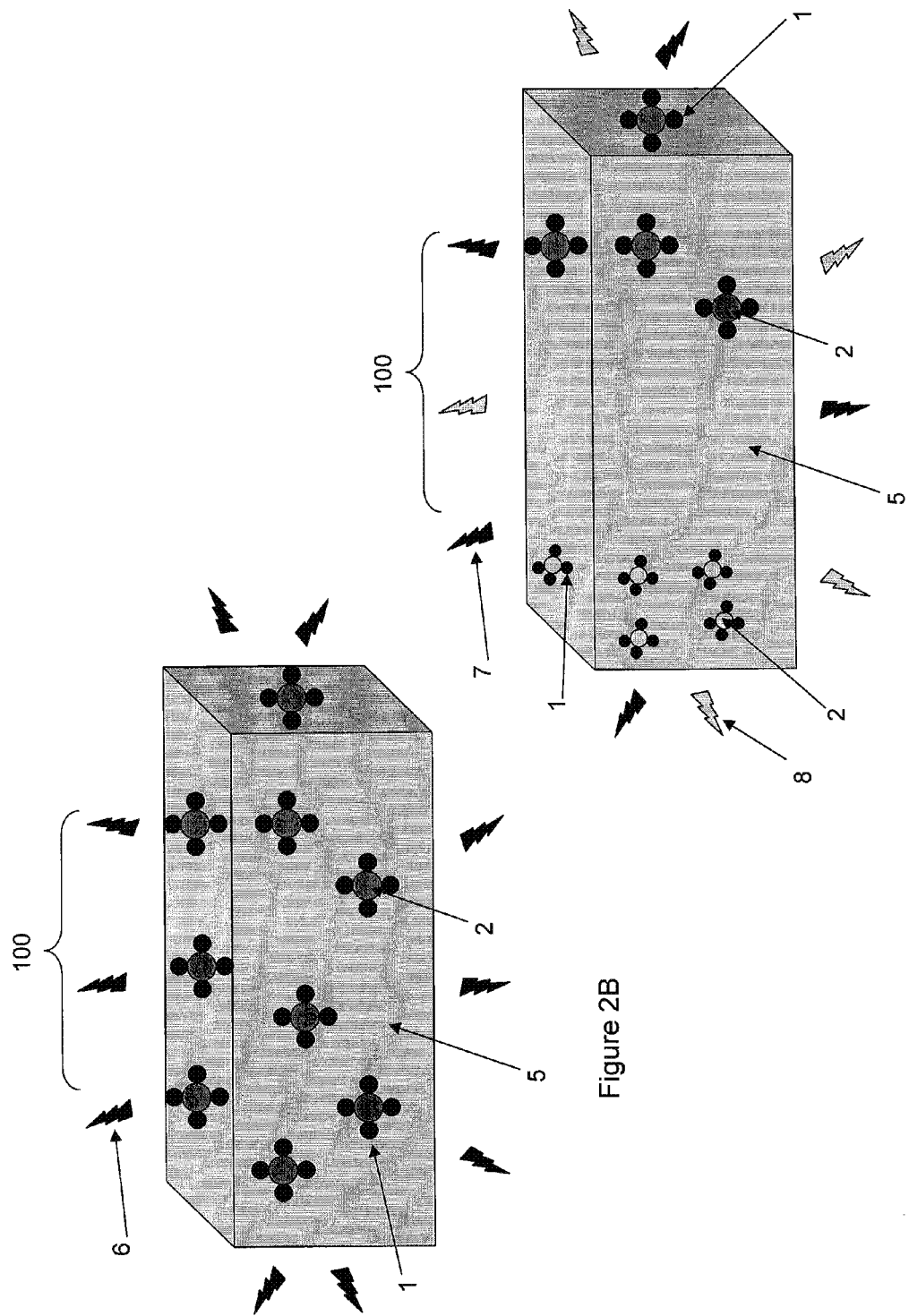

In another embodiment, and as shown in FIG. 2B, the illuminating device 100 generates monochromatic light. In such embodiments, the material 5 comprises quantum dots 1 of the same type (e.g. the same diameter, bandgap etc.) dispersed therein. The light generated by the quantum dots 1 upon activation by the radiation emitted by the radioisotope 2 will be emitted as monochromatic light 6.

In another embodiment, more than one color of light, e.g. polychromatic light, may be produced. When generating more than one color of light, it is usually desirable that the QDs be isolated from each other within the matrix. For example, when two QDs of different sizes are in close contact, the larger QD, which has a lower characteristic emission energy, will tend to absorb a large fraction of the emissions of the smaller QD, and the overall energy efficiency of the device will be reduced, while the color will shift towards the red. To avoid such problems, and as shown in FIG. 2C, it is also within the scope of the present disclosure to comprise an illuminating device 100 that comprises a plurality of quantum dots 1 of different types (e.g. different diameters, bandgaps, etc.) dispersed in a material 5. In such embodiments, it is preferable that the different sized QDs be placed in different parts of the material to avoid unwanted absorption of emission by the larger QDs. The light of different colors, 7, 8 (in this example, two different colors are generated, however, it is within the scope of the disclosure that multiple colors may be generated) is then generated by the quantum dots 1 upon activation by the subatomic particles emitted by the radioisotope 2 resulting in the emission of polychromatic light 7, 8.

Referring again to FIG. 2B, the illuminating device 200 may be in the form of a strip. In such embodiments, the material 5 has a thickness of less than 1 inch, preferably less than 0.5 inches, more preferably less than 0.25 inches. Such embodiments are useful for attaching the device, for example, to an article of clothing or military equipment for IFF purposes. For example, The device, such as a patch depicted in FIG. 2D, may be placed on the troop (e.g., on the uniform, backpack, helmet or the like). Alternatively, and as depicted in FIG. 2E, the device may be a larger form, such as a block, and may be placed on a piece of equipment, such as a tank, plane, armored personnel vehicle or the like.

Figure 2E:
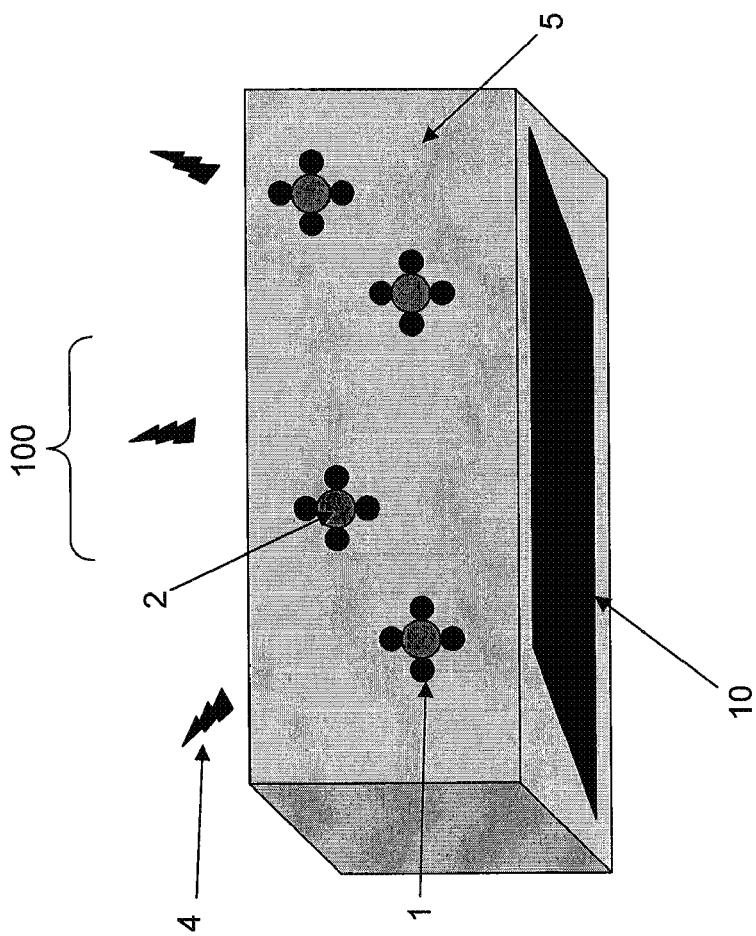
Figure 2D:
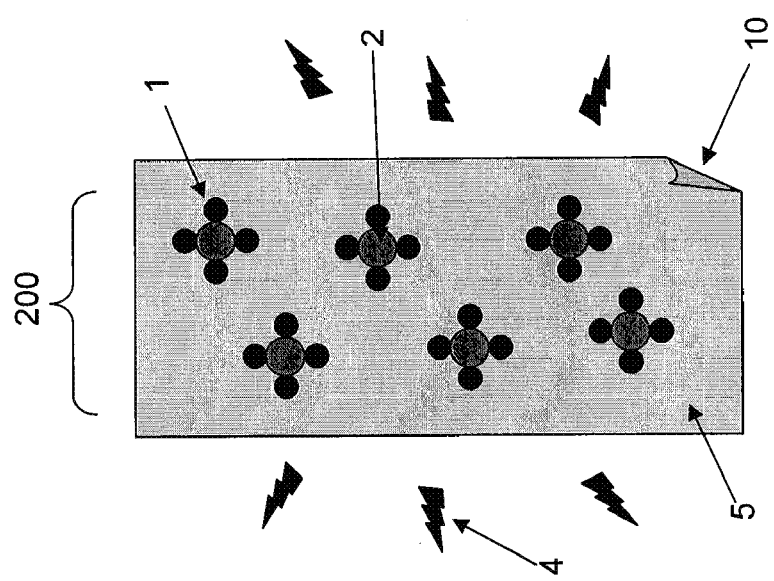

It is also within the scope of the present disclosure, and as shown in FIGS. 2D and 2E, that the devices 100, 200 may further comprise an attaching means 10 for attaching the device to an object. The attaching means may comprise an adhesive means, such as glue, epoxy, tape, or the like, or other mechanical attaching means, such as Velcro, hooks, loops and the like.

Another aspect of the disclosure relates to an illumination device comprising a plurality of quantum dots, a radioisotope, and a container, wherein the plurality of quantum dots and radioisotope are positioned within the container. In one embodiment, and as shown in FIG. 3A, the illumination device 300 comprises a plurality of quantum dots 1 co-mingled with the radioisotope 2 such that the quantum dots 1 and radioisotope 2 are in radioactive communication, resulting in the generation of light 4.

Figure 3B:
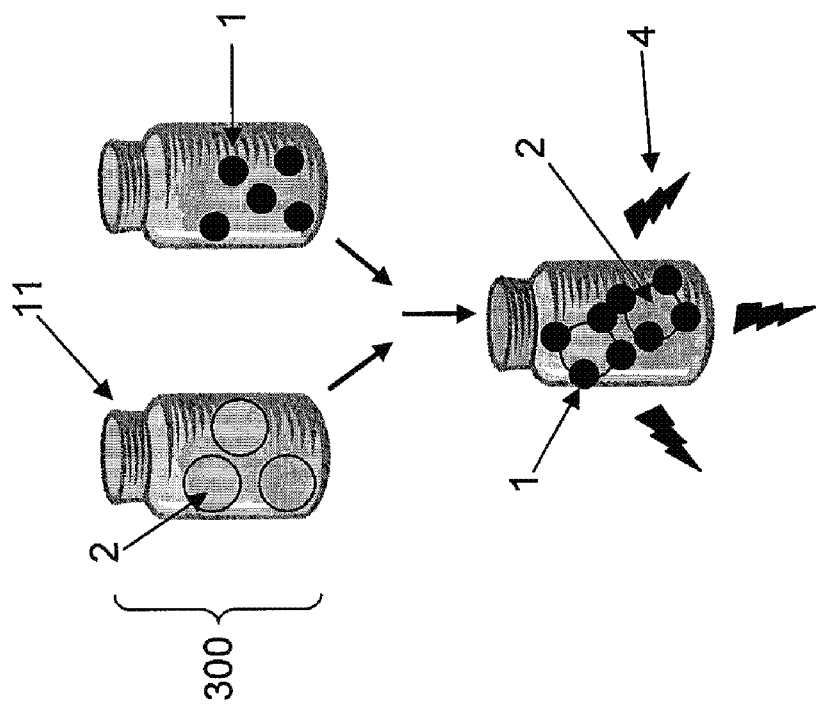
FIGS. 3A-3E are representative embodiments of self-powered illumination devices according to the present disclosure.
Figure 3A:
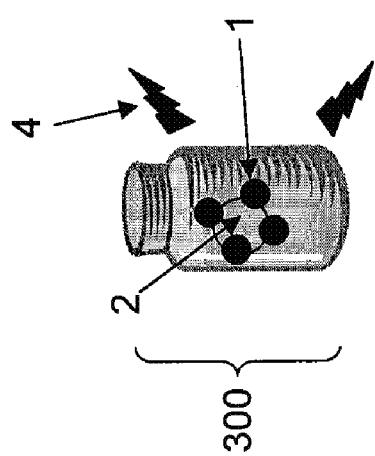

In another embodiment, and as shown in FIG. 3B, the device 300 comprises a plurality of quantum dots 1 and radioisotope 2 which are contained in separate containers containing a removable top 11, whereby when illumination is desired, a user may combine the contents of the containers thereby allowing for the plurality of quantum dots 1 to be in radioactive communication with the radioisotope 2, thereby generating light 4.

Figure 3D:
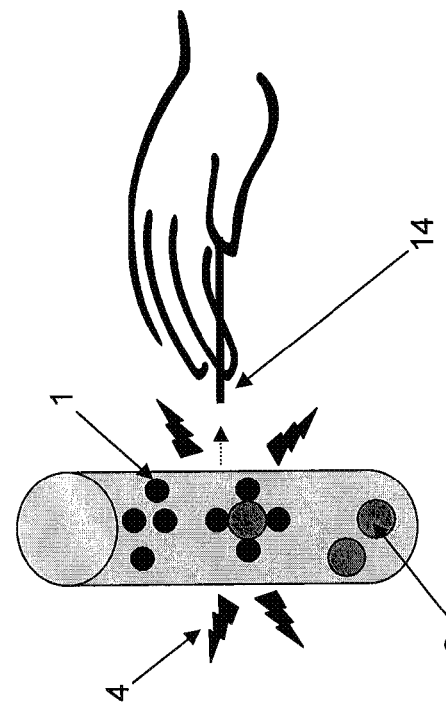
Figure 3E:
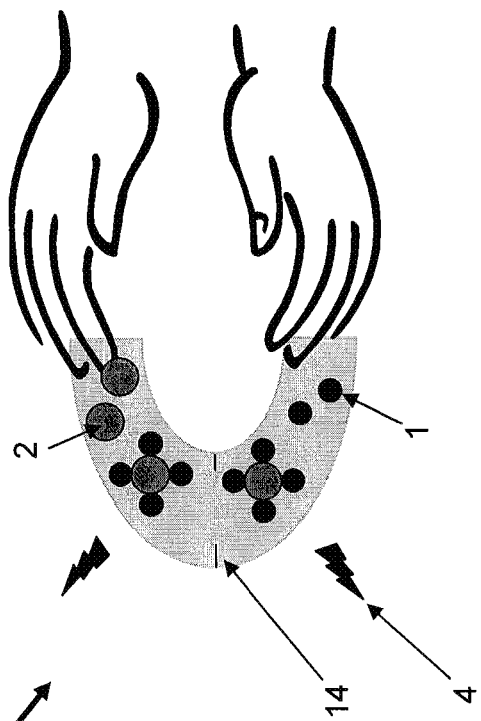
Figure 3C:
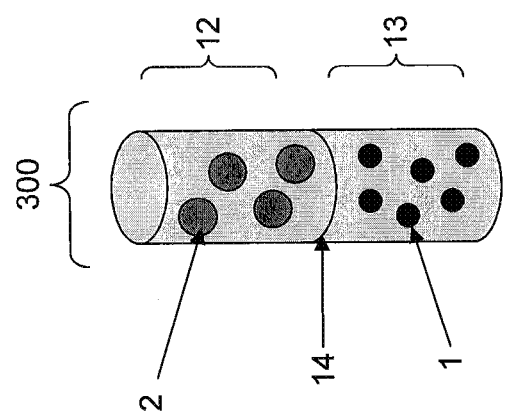

In another embodiment, and as shown in FIG. 3C, the container 300 may comprise a first 12 and second 13 compartment, wherein the plurality of quantum dots 1 and radioisotope 2 are positioned within either the first compartment 12 and/or the second compartment 13. In such embodiments, the first 12 and second 13 compartments are divided by a dividing means 14, where the dividing means 14 prevents the plurality of quantum dots 1 and radioisotope 2 from being in radioactive communication with each other. In one embodiment, and as shown in FIG. 3D, the dividing means 14 is removable, whereby removing the dividing means results in the contents of the first 12 and second 13 compartments to co-mingle. The co-mingling allows for the plurality of quantum dots 1 and radioisotope 2 to come into radioactive communication with each other, thereby resulting in the generation of light 4. In another embodiment, and as shown in FIG. 3E, the dividing means 14 is breakable, whereby upon the flexing or shaking of the container 300, the dividing means 14 breaks thereby resulting in the co-mingling of the contents of the first 12 and second 13 compartments.

In other embodiments, the plurality of quantum dots and radioisotopes are in the form of a powder. In other embodiments, the plurality of quantum dots and radioisotopes are in the form of a solution. In one embodiment, the co-mingled radioisotope and plurality of quantum dots are kept within a transparent or translucent container, whereby the light generated by said plurality of quantum dots is transmitted through said container. In other embodiments, particularly for emergency or temporary applications, it is within the scope of the disclosure that upon co-mingling of the plurality of quantum dots and radioisotope, the contents (e.g., co-mingled QDs and radioisotope in powder or liquid form) may be poured or spread over an area where illumination is desired. In such embodiments, the container need not be transparent or translucent and may be made of materials such as lead, aluminum, aluminum oxide, and alloys thereof.

In other embodiments, where a more permanent application is desired, it is also within the scope of the disclosure that the contents may be "fixed" to the area or object to be illuminated by dispersing the powder or solution followed by overspraying with a clear coating, such as clear epoxy, glue and the like.

In other embodiments of the present disclosure, the devices are preferably portable. In other embodiments, the devices are handheld.

In yet another aspect of the present disclosure provides a method of generating light comprising providing a radioisotope, providing a plurality of quantum dots, and co-mingling the radioisotope and plurality of quantum dots such that the radioisotope and plurality of quantum dots are in radioactive communication with each other resulting in the generation of light.

It is understood that the foregoing detailed description and the following examples are illustrative only and are not to be taken as limitations upon the scope of the disclosure. Various changes and modifications to the disclosed embodiments, which will be apparent to those skilled in the art, may be made without departing from the spirit and scope of the present disclosure. Further, all patents, patent applications and publications cited herein are incorporated herein by reference.

We claim:

1. An illuminating device comprising:
   (a) a radioisotope, wherein said radioisotope is capable of emitting alpha or beta particles;
   (b) a plurality of quantum dots; and
   (c) a container comprising said radioisotope, said plurality of quantum dots, and a dividing means preventing said radioisotope and said plurality of quantum dots from being in radioactive communication with each other.

2. The device according to claim 1, wherein said quantum dot is comprised of an inert material.

3. The device according to claim 1, wherein said quantum dot comprises a core selected from the group consisting of CdS, CdTe, ZnS, ZnS, ZnSe, ZnTe, GaAs, GaP, GaAs, GaSb, HgS, HgSe, HgTe, InAs, InP, InSb, AlAs, AlP, AlSb, PbS, PbSe, PbTe alloys thereof, and combinations thereof.

4. The device according to claim 1, wherein said quantum dot further comprises a coating selected from the group consisting of ZnO, ZnS, ZnSe, ZnTe, CdO, CdS, CdSe, CdTe, MgS, MgSe, GaAs, GaN, GaP, GaSb, HgO, HgS, HgSe, HgTe, InAs, InN, InP, InSb, AlAs, AlN, AlP, AlSb, alloys thereof, and combinations thereof.

5. The device according to claim 1, wherein said quantum dot comprises a diameter in a range from 1 to 50 nm.

6. The device according to claim 1, wherein said quantum dot comprises a diameter in a range from 1 to 40 nm.

7. The device according to claim 1, wherein said quantum dot comprises a diameter in a range from 1 to 20 nm.

8. The device according to claim 1, wherein said quantum dot emits light in a wavelength of $10^{-3}$ to $10^{-12}$ meters when excited by said alpha or beta particle.

9. The device according to claim 8, wherein said quantum dot emits light in a wavelength of $10^{-2}$ to $10^{-10}$ meters when excited by said alpha or beta particle.

10. The device according to claim 9, wherein said quantum dot emits light in a wavelength of $10^{-5}$ to $10^{-8}$ meters when excited by said alpha or beta particle.

11. The device according to claim 1, wherein said radioisotope is selected from the group consisting of nickel-63, thallium-204, strontium-90, promethium-147, phosphorous-32, iodine-131, potassium-42, and gold-198.

12. The device according to claim 11, wherein said radioisotope is nickel-63.

13. The device according to claim 1, wherein said medium is selected from the group consisting of Sol Gel glass, polyacrylate, polystyrene, polyimide, polyacrylamide, polyethylene, polymethylmethacrylate polyvinyl, poly-diacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, and cellulose.

14. The device according to claim 13, wherein said medium is Sol Gel glass or polymethylmethacrylate.

15. The device according to claim 1, wherein said material is in the form of a strip, wherein said strip has a thickness of less than one inch.

16. The device according to claim 1, further comprising an attaching means.

17. The device according to claim 1, wherein said dividing means is configured to provide for said radioisotope and said plurality of quantum dots to be co-mingled within said container, wherein said co-mingling results in said radioisotope and said plurality of quantum dots being in radioactive communication, resulting in illuminated light.

18. The device according to claim 17, wherein said dividing means is removable or breakable, wherein upon removal or breakage of said dividing means, said radioisotope and said plurality of quantum dots co-mingle resulting in said radioisotope and said plurality of quantum dots to be in radioactive communication.

19. The device according to claim 1, wherein said container is transparent or translucent.

20. The device according to claim 1, wherein said radioisotope and said plurality of quantum dots are in the form selected from the group consisting of a powder and solution.

21. The device according to claim 20, wherein said container further comprises a removable top, wherein upon removal of said removable top, said powder or solution can be dispersed from said container.

22. The device according to claim 1, wherein said dividing means is breakable, wherein upon flexing or shaking of said container, said dividing means breaks allowing for said plurality of quantum dots and radioisotope to co-mingle, wherein said co-mingling results in said plurality of quantum dots to be in radioactive communication with said radioisotope, resulting in illuminated light.

23. The device according to claim 1, wherein said device is portable.

24. The device according to claim 1, wherein said device is handheld.

25. A method of generating light comprising:
(a) providing a radioisotope, wherein said radioisotope is capable of emitting alpha or beta particles;
(b) providing a plurality of quantum dots;
(c) providing a container comprising a first compartment, a second compartment, and a removable dividing means, wherein said radioisotope is located in said first compartment, said plurality of quantum dots is located in said second compartment; and
(d) removing said dividing means and co-mingling said radioisotope and said a plurality of quantum dots, wherein said comingling results in said radioisotope and said plurality of quantum dots being in radioactive communication resulting in illuminated light.

26. The method according to claim 25, further comprising the step of providing a medium, wherein said radioisotope or said plurality of quantum dots are embedded within said medium.

27. The method according to claim 25, wherein the container is transparent or translucent.

* * * * *